United States Patent [19]

Voigt

[11] Patent Number: 4,710,113
[45] Date of Patent: Dec. 1, 1987

[54] APPARATUS FOR GRANULATING PLASTICS MATERIALS

[75] Inventor: Jürgen Voigt, Wathlingen, Fed. Rep. of Germany

[73] Assignee: Hermann Berstorff Maschinenbau GmbH, Hanover, Fed. Rep. of Germany

[21] Appl. No.: 933,158

[22] Filed: Nov. 21, 1986

[30] Foreign Application Priority Data

Nov. 23, 1985 [DE] Fed. Rep. of Germany ....... 3541500

[51] Int. Cl.⁴ .............................................. B28B 11/16
[52] U.S. Cl. ..................................... 425/67; 264/142; 425/311; 425/313
[58] Field of Search ............................. 264/140–144; 425/67–70, 196, 310, 311, 313, 315, 316, 378 R, 379 R, 463, 464

[56] References Cited

U.S. PATENT DOCUMENTS

| | | | |
|---|---|---|---|
| 3,353,213 | 11/1967 | Niemeyer | 425/313 |
| 3,867,082 | 2/1975 | Lambertus | 425/313 |
| 3,892,834 | 7/1975 | Pritchard | 264/142 |
| 4,021,176 | 5/1977 | Dettmer et al. | 264/142 |
| 4,182,605 | 1/1980 | Dettmer | 264/142 |
| 4,285,652 | 8/1981 | Anders | 264/142 |
| 4,529,370 | 7/1985 | Holmes et al. | 425/67 |

FOREIGN PATENT DOCUMENTS

| | | | |
|---|---|---|---|
| 54-72261 | 6/1979 | Japan | 264/142 |
| 59-14916 | 1/1984 | Japan | 425/311 |
| 848596 | 9/1960 | United Kingdom | 425/311 |

Primary Examiner—Jay H. Woo
Assistant Examiner—J. Fortenberry
Attorney, Agent, or Firm—Schwartz, Jeffery, Schwaab, Mack, Blumenthal & Evans

[57] ABSTRACT

An apparatus for granulating thermoplastics materials comprising a nozzle plate and a cutter device in which the spacing between these integers can be pre-set and accurately maintained. This is achieved by isolating the component parts of the granulation apparatus, particularly a housing for the cutter device, which is subjected to variable thermal expansion, from the components which locate the cutter device in front of the nozzle plate.

7 Claims, 2 Drawing Figures

APPARATUS FOR GRANULATING PLASTICS MATERIALS

FIELD OF THE INVENTION

The present invention relates to an apparatus for granulating plastics materials. More particularly, the present invention relates to a granulating apparatus which comprises a rotatable cutter device immersed in water, the device being located within a housing provided with an inlet for water and the granulated material. The cutter device rotates in front of a nozzle plate and a bearing housing is provided which accommodates a shaft on which the cutter device is rotatably mounted.

BACKGROUND OF THE INVENTION AND PRIOR ART DISCUSSION

Such an apparatus of this general type is disclosed in German Auslegeschrift No. 1 454 765. One end of the cutter housing, through which the granules are discharged by means of water which is simultaneously used for conveying and cooling purposes, is mounted on a flange provided on an extrusion device. The other end of the cutter housing rests on the shaft for the cutter device. A V-belt drive pulley means for effecting fine-adjustment, in an axial direction, of the spacing between the cutter device and the nozzle plate, and a pneumatic piston and cylinder arrangement for effecting axial displacement of the cutting unit are all mounted on the blade shaft.

It is extremely important, in such an apparatus, to be able to set the spacing between the rotating cutter device and the nozzle plate very accurately. However, it is equally important that this, setting, once determined, is maintained during the operation of the granulator.

Extruded strands of material, such as polyethylene, emerge from the nozzle plate at an elevated temperature which may be as high as 250° C. The rotating cutter device cuts the extruded strands into granules which are cooled and conducted away for discharge by water fed into the cutter housing.

The nozzle plate needs to be at a high temperature to prevent the plastics material from hardening in the small diameter bores of the nozzle. If such hardening occurs, the material will, of course, block the bores.

However, the temperature of the nozzle plate also causes the cutter housing to be heated. An obvious consequence of such heating is uncontrolled thermal expansion of the housing. This expansion may cause displacement of the mounting connected to the housing for the blade shaft. This means that the pre-set spacing between the rotating cutter device and the nozzle plate changes. A reduction in the spacing produces considerable wear on the rotating cutter device and on the surface of the nozzle plate. On the other hand, if the spacing increases, poor granulation results because granules tend, in such a case, to drag filaments with them and cause congestion of the nozzle plate.

OBJECTS OF THE INVENTION

The present invention seeks to provide a granulation apparatus which overcomes the disadvantages of the prior art arrangement described hereinbefore. More particularly, the present invention seeks to provide an apparatus in which thermal expansion of the cutter housing and of the nozzle plate do not adversely affect the setting of the spacing between the cutter device and the nozzle plate. By so doing, a highly accurate alignment of the rotating cutter device relative to the nozzle plate can be achieved and maintained. Moreover, such alignment is not adversely affected by thermal expansions of components which become heated during operation of the apparatus.

SUMMARY OF THE INVENTION

According to the present invention, there is provided an apparatus for granulating plastics material comprising a rotatable cutter device immersed in water, the device being located within a housing provided with an inlet for water and an outlet for the water and the granulated material, the cutter device rotating in front of a nozzle plate, and a bearing housing accommodating a shaft on which the cutter device is rotatably mounted, wherein the bearing housing, which accommodates the blade shaft and a mounting for the blade shaft, is connected to means mounting the nozzle plate by means support arms which are out of contact with the cutter housing and a base portion of the granulation apparatus.

By ensuring that the bearing housing, which accommodates the blade shaft and its mounting, is directly connected to means mounting the nozzle plate through the intermediary of support arms, thermal expansion of the cutter housing, the nozzle plate and other comonent parts does not adversely affect the pre-set spacing between the rotating cutter device and the nozzle plate.

Since the support arms extend freely, that is to say, they are not connected to the cutter housing, which receives the conveying and cooling water, and the granulator base, an accurate connection has been provided for the component parts which remains relatively unaffected by thermal expansion and other forces which occur during operation of the apparatus.

Accordingly, all of the component parts of the granulation apparatus which could have an adverse effect on the alignment between the cutter device and the nozzle plate are maintained out of contact therewith.

By separating the cutter housing from the bearing housing and from the mounting for the cutter shaft, it is impossible for the thermal expansion of the cutter housing to cause displacement of the blade shaft. Such displacement, if it occurred, would cause considerable wear of the cutter device and of the nozzle plate.

The cutter housing is mounted on the nozzle plate and is sealed relative to the mounting for the cutter shaft by means of a displaceably mounted seal, with the result that even minimal changes in the temperature of the cutter housing do not produce mis-alignment of the blade shaft.

The support arms retain and support the bearing housing, together with the cutter shaft, and the cutter head. A resilient coupling is disposed between the drive for the cutter device and the shaft on which it is mounted for rotation, so that forces produced by the drive do not affect the position of the cutter device relative to the nozzle plate.

Alternatively, the means mounting the nozzle plate comprises a nozzle flange having the nozzle plate mounted on the surface thereof facing the blade shaft end, the opposed surface of the nozzle plate being connected to a flange mounted on an extrusion device, thereby providing a connection between the cutting device and the nozzle plate, which is also relatively unaffected by thermal expansion of other component parts.

Preferably, the surface of the cutter housing adjacent the extrusion device is sealed on the nozzle plate and the opposed surface thereof adjacent the bearing housing is sealed by a displaceable sealing member.

The provision of such a displaceable seal for the wall of the cutter housing adjacent the bearing housing and the direct mounting of the other wall of the cutter housing on the nozzle plate effectively prevents the possibility of thermal expansion of the cutting housing causing displacement of the cutter shaft.

BRIEF DESCRIPTION OF THE DRAWINGS

One embodiment of a granulating apparatus in accordance with the present invention will be further described, by way of example, with reference to the accompanying drawings, in which.

DESCRIPTION OF PREFERRED EMBODIMENT

Figure 1:
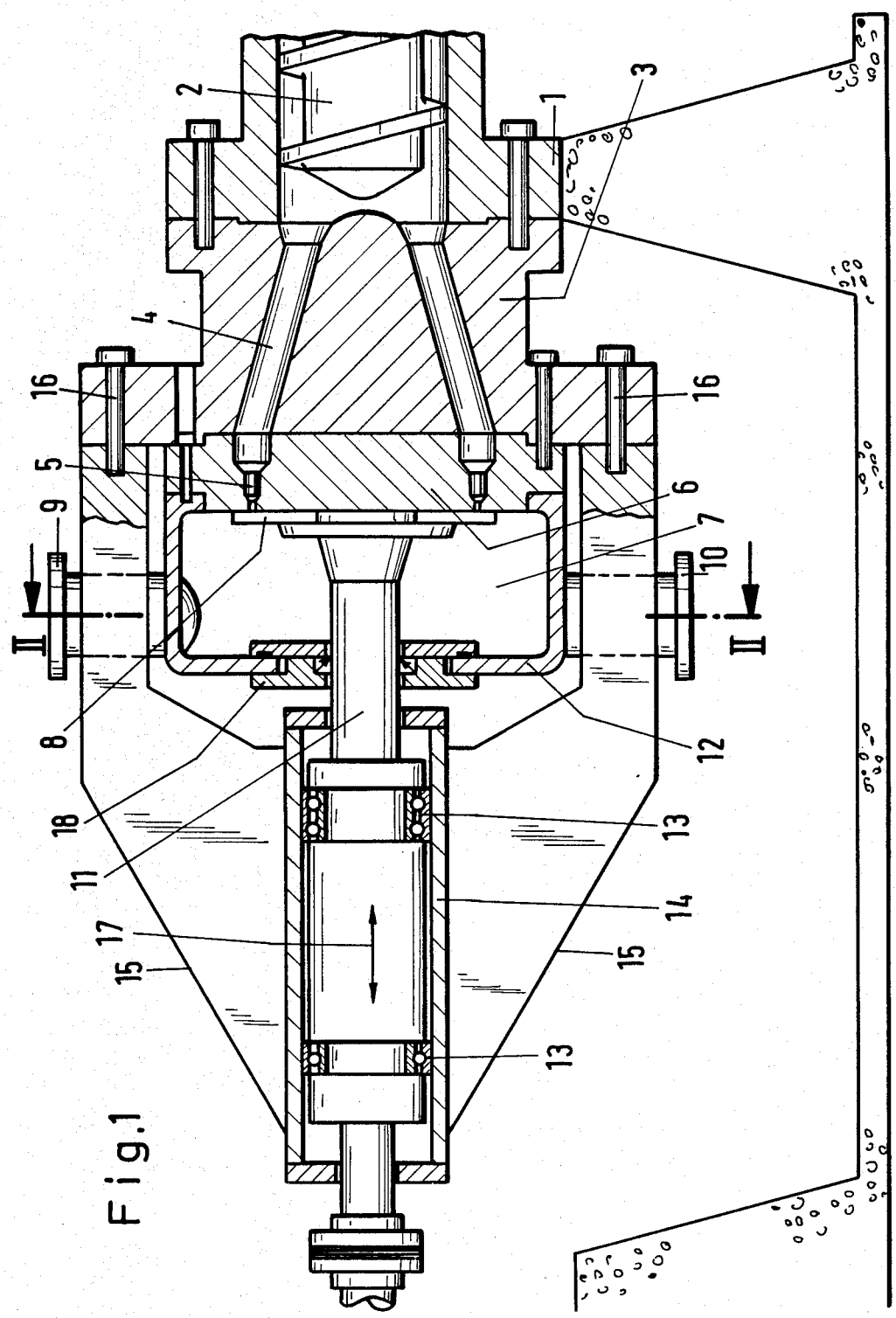
FIG. 1 is a schematic longitudinal sectional view through a granulating apparatus including a cutter device which is immersed in water.
Figure 2:
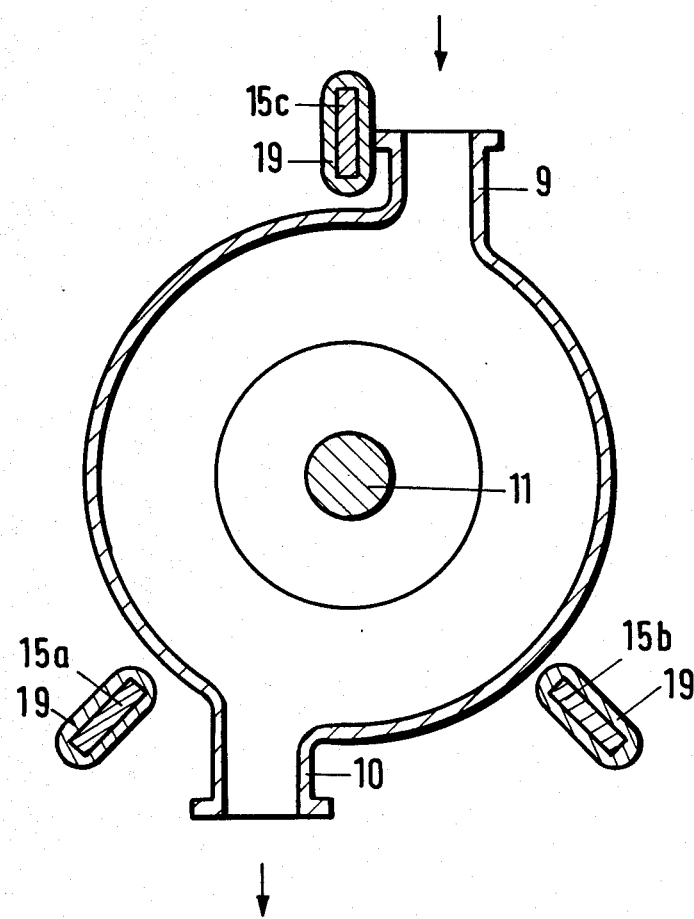
FIG. 2 is a cross-sectional view taken along the line II—II of FIG. 1.

In FIG. 1, there is shown the discharge end of an extrusion screw 2 which is mounted for rotation in an extrusion barrel. The discharge end of the barrel is provided with a flange 1 which is connected to a nozzle flange 3. Thermoplastics material extruded by the screw passes into melting or fusion passages 4 provided in the nozzle flange 3. The passages 4 communicate with bores 5 formed in a nozzle plate 6. The thermoplastics material is extruded in the form of strands through the nozzle bores 5 and passes into a water-filled cutting chamber 7.

The extruded strands of material emerging from the nozzle bores 5 are severed by a cutter device in the form of rotating cutting blades 8, which are screw-connected to a blade head member. The granules of material thus formed are discharged from a housing 12 defining the cutting chamber 7 through an outlet 10 using water as the conveyancing medium. The water is fed into the chamber 7 through an inlet 9 disposed substantially diametrically opposite the outlet 10.

The cutter housing 12 is screw-threadedly connected to the nozzle plate 6 and is sealed on its face opposed to the plate 6 by means of a sealing member 18. The seal 18 is so designed as to permit it to effect both axial and radial movement relative to the blade shaft 11 without losing its sealing effect. By so doing, thermal expansion of the cutting chamber housing 12 can occur in an unhindered manner.

Support arms 15a, 15b and 15c, which are mounted on the nozzle flange 3 by means of screw-threaded connections 16 are provided to support a bearing housing 14, a mounting 13 for the blade shaft and the blade shaft 11 which includes the blade head member and the cutting blades 8. The blades are thus maintained in a fixed position relative to the nozzle plate 6.

The support arms 15a, 15b and 15c extend freely and gaps exist between each of the support arms and the cutting chamber housing 12. Accordingly, the temperature of the housing 12 has little affect on the support arms. In other words, thermal expansion of the housing 12 will cause minimal or no expansion of the support arms. There is virtually no adverse effect on the length of the support arms caused by the temperature of the cutting chamber housing 12 rising to, for example, 80° C.

If desired, the support arms 15a, 15b and 15c may be coated with a thermally insulating material 19, so that even slight thermal expansion is avoided. In many cases, however, such an insulation coating 19 is not necessary.

I claim:

1. An apparatus for granulating plastics material comprising a bearing housing, shaft bearing means disposed within said bearing housing, shaft means journalled to rotate in said bearing means and cutter means mounted on said shaft for rotation therewith externally of said housing, nozzle plate means disposed opposite said cutter means and spaced at a pre-set distance therefrom and means mounting said nozzle plate means to a base member, feed means supplying plastics materials to be granulated to said nozzle plate means, cutter housing means surrounding said cutter, said cutter housing means defining an inlet for water and an outlet disposed substantially diametrically opposite said inlet for discharging said water and granules produced by said cutter device, said water simultaneously acting as a cooling and granule conveying medium, said cutter device being immersed in said water during operation of said apparatus, and support arm means directly connecting said bearing housing to said nozzle plate mounting means wherein said cutting housing means is located therebetween, said support arms being thermally isolated from said cutter housing and from said base member.

2. An apparatus as recited in claim 1, wherein said support arm means comprises three support arm members and wherein said bearing housing includes a medial horizontal axis, two of said arm members being disposed below the medial horizontal axis of the bearing housing and one said arm member being above said axis.

3. An apparatus as recited in claim 1 wherein said means mounting said nozzle plate comprises a nozzle flange and wherein said plastics material feed means comprises an extrusion device, said extrusion device including a barrel and flange means disposed around one end of said barrel, said nozzle flange comprising opposed first and second major surfaces, said first major surface mounting said nozzle plate and said second major surface connecting with said extrusion device flange.

4. An apparatus as recited in claim 3, wherein said cutter housing defines opposed first and second wall surfaces, said first wall surface lying adjacent said extrusion device and sealing on said nozzle plate and said second wall surface lying adjacent said bearing housing, said apparatus further comprising sealing means sealing said second wall surface from said bearing housing.

5. An apparatus as recited in claim 3, wherein each said support arm includes an end region remote from said mounting of said arms on said bearing housing, said bearing arm end regions including means for connection to said nozzle flange.

6. An apparatus as recited in claim 3, wherein each said support arm includes an end region remote from said mounting of said arms on said bearing housing, said bearing arm end regions including means for connection to said flange of said extrusion device.

7. An apparatus as recited in claim 1, wherein said support arms include a thermally insulating external coating.

* * * * *